US010544286B2

(12) United States Patent
Nakano et al.

(10) Patent No.: US 10,544,286 B2
(45) Date of Patent: Jan. 28, 2020

(54) POLYAMIDE MOULDING COMPOSITION AND MOULDED ARTICLE MADE FROM THIS MOULDING COMPOSITION

(71) Applicant: EMS-PATENT AG, Domat/Ems (CH)

(72) Inventors: Kosuke Nakano, Tokyo (JP); Makoto Endo, Yokohama Kanagawa (JP); Minoru Hatta, Funabashi Chiba (JP)

(73) Assignee: EMS-PATENT AG, Domat/Ems (CH)

( * ) Notice: Subject to any disclaimer, the term of this patent is extended or adjusted under 35 U.S.C. 154(b) by 134 days.

(21) Appl. No.: 15/546,373

(22) PCT Filed: Feb. 13, 2015

(86) PCT No.: PCT/EP2015/053105
§ 371 (c)(1),
(2) Date: Jul. 26, 2017

(87) PCT Pub. No.: WO2016/128067
PCT Pub. Date: Aug. 18, 2016

(65) Prior Publication Data
US 2018/0022900 A1    Jan. 25, 2018

(51) Int. Cl.
*C08K 7/14* (2006.01)
*C08K 3/34* (2006.01)

(52) U.S. Cl.
CPC ............. *C08K 7/14* (2013.01); *C08K 3/34* (2013.01); *C08K 2201/003* (2013.01); *C08K 2201/005* (2013.01)

(58) Field of Classification Search
CPC ... C08K 7/14; C08K 7/02; C08K 7/04; C08K 13/04; C08L 77/06
USPC ........................................................ 524/607
See application file for complete search history.

(56) References Cited

U.S. PATENT DOCUMENTS

| | | | |
|---|---|---|---|
| 8,324,297 B2 | 12/2012 | Hewel et al. | |
| 8,349,941 B2 | 1/2013 | Stoppelmann | |
| 8,859,662 B2 | 10/2014 | Lamberts et al. | |
| 9,012,566 B2 * | 4/2015 | Buhler | C08G 69/265 524/538 |
| 10,246,587 B2 * | 4/2019 | Yasuda | C08L 77/02 |
| 2003/0153677 A1 * | 8/2003 | Warth | C08F 279/02 525/66 |
| 2003/0162900 A1 * | 8/2003 | Joachimi | C08L 77/00 525/178 |
| 2004/0034152 A1 * | 2/2004 | Oka | C08K 3/22 524/497 |
| 2004/0167268 A1 * | 8/2004 | Vathauer | C08L 51/04 524/445 |
| 2008/0021143 A1 * | 1/2008 | Thullen | C08K 7/14 524/423 |
| 2009/0012229 A1 | 1/2009 | Desbois et al. | |
| 2009/0062452 A1 * | 3/2009 | Harder | C08G 69/26 524/494 |
| 2010/0249307 A1 | 9/2010 | Stoppelmann | |
| 2011/0184099 A1 | 7/2011 | Hewel et al. | |
| 2011/0281990 A1 * | 11/2011 | Lamberts | C08K 3/22 524/425 |
| 2014/0329944 A1 * | 11/2014 | Harder | C09K 21/12 524/133 |
| 2017/0051127 A1 * | 2/2017 | Morick | B29B 7/48 |
| 2018/0155510 A1 * | 6/2018 | Niessner | C08J 5/08 |
| 2019/0160373 A1 * | 5/2019 | Near | A63F 3/0023 |

FOREIGN PATENT DOCUMENTS

| | | |
|---|---|---|
| CN | 102140247 A | 8/2011 |
| CN | 102250466 A | 11/2011 |
| EP | 2 055 743 A1 | 5/2009 |
| EP | 2 388 293 A1 | 11/2011 |
| EP | 2 687 555 A1 | 1/2014 |
| JP | 2009-149763 A | 7/2009 |
| JP | 2013-067786 A | 4/2013 |
| JP | 6497823 B2 | 4/2019 |
| KR | 2008-0100288 A | 11/2008 |
| KR | 2011-0126550 A | 11/2011 |

(Continued)

OTHER PUBLICATIONS

"Wollastonite," Chemicals Dictionary, Oki et al., editors, Tokyo Kagaku Dojin Co., Ltd., pp. 420-421 (no date given; consider it as prior art for this IDS).
Japan Patent Office, Notification of Reason for Refusal in Japanese Patent Application No. 2017-536573 (dated Nov. 7, 2018) Yes.
Korean Intellectual Property Office, Notification of Reason for Refusal in Korean Patent Application No. 10-2017-7024413 (dated Apr. 11, 2018).
European Patent Office, Communication Pursuant to Article 94(3) EPC in European Patent Application No. 15 705 011.3 (dated May 29, 2018).
International Bureau of WIPO, International Preliminary Report on Patentability in International Application No. PCT/EP2015/053105 (dated Aug. 24, 2017).

(Continued)

Primary Examiner — Jane L Stanley
(74) Attorney, Agent, or Firm — Leydig, Voit & Mayer, Ltd.

(57) ABSTRACT

The present invention refers to a polyamide moulding composition consisting of the following components: a) 45 to 75% by weight of at least one partially crystalline polyamide consisting of at least one diamine and at least one aromatic dicarboxylic acid, whereupon the at least one diamine has 4 to 18 carbon atoms and is selected from a group of diamines consisting of linear aliphatic diamines, branched aliphatic diamines and cycloaliphatic diamines, b) 5 to 20% by weight of at least one fibrous reinforcing agent, c) 10 to 40% by weight of at least one non-sized filler which is different from the fibrous reinforcing agent in b), d) 0 to 10% by weight of a at least one additive, with the proviso that the component b) and c) add up to 25 to 45% by weight and the entirety of components a) to d) add up to 100% by weight. Moreover, the present invention refers to a moulded article producible from this moulding composition.

12 Claims, No Drawings

(56) References Cited

FOREIGN PATENT DOCUMENTS

| WO | WO 2007/101809 A2 | 9/2007 |
| WO | WO 2009/012933 A1 | 1/2009 |
| WO | WO 2013/026779 A1 | 2/2013 |

OTHER PUBLICATIONS

European Patent Office, Communication Pursuant to Article 94(3) EPC in European Patent Application No. 15 705 011.3 (dated Aug. 2, 2018).
European Patent Office, International Search Report in International Application No. PCT/EP2015/053105 (dated Jul. 24, 2015).
European Patent Office, Written Opinion in International Application No. PCT/EP2015/053105 (dated Jul. 24, 2015).
Korean Intellectual Property Office, Notification of Reason for Refusal in Korean Patent Application No. 10-2017-7024413 (dated Oct. 24, 2018).
Galuskin et al., "Morphology, Composition and Structure of Low-Temperature P4/nnc High-Fluorine Vesuvianite Whiskers from Polar Yakutia, Russia," *The Canadian Mineralogist* 41: 843-856 (2003).
State Intellectual Property Office of People's Republic of China, First Office Action in Chinese Patent Application No. 201580075696.7 (dated Apr. 18, 2019).
Ministry of Law and Human Rights, Republic of Indonesia, Notification of Substantive Examination Results in Indonesian Patent Application PID201705039-TA (Sep. 5, 2019).

\* cited by examiner

POLYAMIDE MOULDING COMPOSITION AND MOULDED ARTICLE MADE FROM THIS MOULDING COMPOSITION

CROSS-REFERENCE TO A RELATED APPLICATION

This patent application is the U.S. national phase of International Application No. PCT/EP2015/053105, filed on Feb. 13, 2015, the disclosure of which is incorporated herein by reference in its entirety for all purposes.

The present invention refers to a polyamide moulding composition consisting of the following components:
- a) 45 to 75% by weight of at least one partially crystalline polyamide consisting of at least one diamine and at least one aromatic dicarboxylic acid, whereupon the at least one diamine has 4 to 18 carbon atoms and is selected from a group of diamines consisting of linear aliphatic diamines, branched aliphatic diamines and cycloaliphatic diamines,
- b) 5 to 20% by weight of at least one fibrous reinforcing agent,
- c) 10 to 40% by weight of at least one non-sized filler which is different from the fibrous reinforcing agent in b),
- d) 0 to 10% by weight of a at least one additive, with the proviso that the component b) and c) add up to 25 to 45% by weight and the entirety of components a) to d) add up to 100% by weight.

Moreover, the present invention refers to a moulded article producible from this moulding composition.

Polyamide moulded articles are broadly used in the engineering field, in particular for electronic components as well as components in the automotive field. Due to the demand for moulded articles with a reduced weight but a high mechanical strength these articles are in general reinforced by fillers, in particular fibrous fillers.

Such polyamides moulded articles are also used for lamp articles, like housings or lamp sockets. These can be used for headlights or rear lamps, in particular in the automotive field. For such articles it is important that they show a minimal fogging also at high temperatures which can occur in the surrounding of the lamp.

WO 2013/026779 A1 describes polyamide composition for LED applications with improved mechanical properties.

JP 2009-149763 A describes a low volatility polyamide composition with good mechanical properties and a low fogging. The polyamide moulding composition is preferably based on Nylon 6 and Nylon 66.

Another polyamide composition with good heat resistance, stability under heating and fogging properties is described in EP 2 687 555 A1.

It was therefore the object of the present invention to provide polyamide moulding compositions with excellent mechanical properties, in particular with a high deflection temperature under load and showing a reduced fogging at high temperatures.

This problem is solved by the polyamide moulding composition as well as the moulded article described herein. Preferred embodiments are also described.

It is provided a polyamide moulding composition which consists of the following components:
- a) 45 to 75% by weight of at least one partially crystalline polyamide consisting of at least one diamine and at least one aromatic dicarboxylic acid, whereupon the at least one diamine has 4 to 18 carbon atoms and is selected from a group of diamines consisting of linear aliphatic diamines, branched aliphatic diamines and cycloaliphatic diamines,
- b) 5 to 20% by weight of at least one fibrous reinforcing agent,
- c) 10 to 40% by weight of at least one non-sized filler which is different from the fibrous reinforcing agent in b),
- d) 0 to 10% by weight of a at least one additive, The composition has the proviso that the component b) and c) add up to 25 to 45% by weight and the entirety of components a) to d) add up to 100% by weight.

The inventive composition is characterized by a very low condensable outgasing (fogging) resulting in a haze of a maximum of 10%. The haze is measured by determining the haze on a glass plate after a thermal treatment of pellets of the polyamide moulding composition at 200° C. for a period of 8 hours.

In the preferred embodiment, the moulding composition has a deflection temperature under load (HDT (A)) according to ISO 75 of at least 190° C., preferably of at least 200 C, and more preferably of at least 210° C.

The moulding composition has preferably a condensable outgasing (fogging) resulting in a haze of a maximum of 7%, more preferably of 5%.

In a further preferred embodiment, the moulding composition comprises the partially crystalline polyamide a) in an amount of 50 to 69.95% by weight, more preferably 53 to 64.9% by weight.

No aliphatic dicarboxylic acids are present in the partially crystalline polyamide a). No lactams or α,ω-amino acids are present in the partially crystalline polyamide a).

The partially crystalline polyamide a) has a melting point of at least 270° C., preferred of 275 to 350° C., more preferred of 280 to 340° C., most preferred of 280 to 330° C.

The at least one diamine of the partially crystalline polyamide a) is preferably selected from the group of diamines consisting of 1,4-butanediamine, 1,5-pentanediamine, 2-methyl-1,5-pentanediamine, 2-butyl-2-ethyl-1,5-pentanediamine, 3,3'-dimethyl-1,5-pentanediamine 1,6-hexanediamine, 2,2,4-trimethylhexamethylenediamine, 2,4,4-trimethylhexamethylenediamine, 1,8-octanediamine, 2-methyl-1,8-octanediamine, 1,9-nonandiamine, 1,10-decanediamine, 1,11-undecanediamine, 1,12-dodecanediamine, 1,13-tridecanediamine and 1,14-tetradecanediamine and mixtures thereof.

The at least one aromatic dicarboxylic acid of the partially crystalline polyamide a) is preferably selected from the group of aromatic dicarboxylic acids consisting of terephthalic acid, isophthalic acid and 2,6-naphthalenedicarboxylic acid, whereupon the portion of isophthalic acid is at most 25 mol-%, preferably at most 20 mol-%, more preferably at most 16 mol-% and the amounts of the dicarboxylic acids add up to 50 mol-%.

More preferably the at least one aromatic dicarboxylic acid of the partially crystalline polyamide is selected from the group of aromatic dicarboxylic acids consisting of terephthalic acid and isophthalic acid, whereupon the portion of isophthalic acid is at most 25 mol-%, preferably at most 20 mol-%, more preferably at most 16 mol-% and the amounts of the dicarboxylic acids add up to 50 mol-%.

The relative viscosity (measured on a solution made of 0.5 g polyamide in 100 ml m-cresol at 20° C.) of the partially crystalline polyamide a) is 1.40 to 2.0, preferably 1.45 to 1.90, more preferably 1.48 to 1.80.

So as can be seen from the relative viscosity the partially crystalline polyamide a) clearly is a polymer and is not an oligomer.

Preferably the partially crystalline polyamide a) is selected from the group of partially crystalline polyamides containing as dicarboxylic acids only aromatic dicarboxylic acids, consisting of polyamides with a 4T-unit, polyamides with a 5T-unit, polyamides with a 6T-unit, polyamides with a 8T-unit, polyamides with a 10T-unit, PA 4T/6T, PA 4T/8T, PA 6T/8T, PA 4T/MPMDT, PA 4T/4I, PA 5T/5I, PA 6T/6I, PA 9T/MODT, PA 9T/9I, PA 10T, PA 10T/6T, PA 10T/6T/10I/6I, PA 12T, PA MPMDT/6T, PA 10T/10I, PA 12T/12I, PA 4T/6T/8T, PA 4T/6T/10T, PA 4T/8T/10T, PA6T/8T/10T, PA 4T/6T/MPMDT and mixtures or blends thereof.

More preferably the partially crystalline polyamide a) is selected from the group of partially crystalline polyamides consisting of PA 6T/6I, PA 9T/MODT, PA 10T, PA 10T/6T, PA 10T/6T/10I/6I, PA 12T, PA MPMDT/6T, PA 10T/10I and mixtures or blends thereof.

Most preferably the partially crystalline polyamide a) is selected from the group of partially crystalline polyamides consisting of PA 6T/6I, PA 10T/6T, PA 10T/6T/10I/6I and mixtures or blends thereof.

The partially crystalline polyamide 6T/6I is made from hexamethylenediamine, terephthalic acid and isophthalic acid with an amount of hexamethylenediamine of 50 mol-%, an amount of terephthalic acid of 25 to 40 mol-% and an amount of isophthalic acid of 10 to 25 mol-%, whereas the amounts of the three monomers add up to 100 mol-% and the amounts of the dicarboxylic acids add up to 50 mol-%.

Preferably the partially crystalline polyamide 6T/6I is made from 50 mol-% hexamethylenediamine, 30 to 40 mol-% terephthalic acid and 10 to 20 mol-% isophthalic acid, whereas the amounts of the three monomers add up to 100 mol-% and the amounts of the dicarboxylic acids add up to 50 mol-%.

More preferably the partially crystalline polyamide 6T/6I is made from 50 mol-% hexamethylenediamine, 35 mol-% terephthalic acid and 15 mol-% isophthalic acid, whereas the amounts of the three monomers add up to 100 mol-% and the amounts of the dicarboxylic acids add up to 50 mol-%. The melting point of this partially crystalline polyamide is 325° C.

The above used description of composition of polyamide 6T/6I with 50 mol-% hexamethylenediamine, 35 mol-% terephthalic acid and 15 mol-% isophthalic acid is equivalent to the description PA 6T/6I (70/30 mol-%).

The partially crystalline polyamide 10T/6T is made from decanediamine, hexamethylenediamine and terephthalic acid with an amount of decanediamine of 20 to 47.5 mol-%, an amount of hexamethylenediamine of 2.5 to 30 mol-% and an amount of terephthalic acid of 50 mol-%, whereas the amounts of the three monomers add up to 100 mol-% and the amounts of the diamines add up to 50 mol-%.

Preferably the partially crystalline polyamide 10T/6T is made from decanediamine, hexamethylenediamine and terephthalic acid with an amount of decanediamine of 30 to 45 mol-%, an amount of hexamethylenediamine of 5.0 to 20 mol-% and an amount of terephthalic acid of 50 mol-%, whereas the amounts of the three monomers add up to 100 mol-% and the amounts of the diamines add up to 50 mol-%.

More preferably the partially crystalline polyamide 10T/6T is made from decanediamine, hexamethylenediamine and terephthalic acid with an amount of decanediamine of 35 to 42.5 mol-%, an amount of hexamethylenediamine of 7.5 to 15 mol-% and an amount of terephthalic acid of 50 mol-%, whereas the amounts of the three monomers add up to 100 mol-% and the amounts of the diamines add up to 50 mol-%.

Most preferably the partially crystalline polyamide 10T/6T is made from 42.5 mol-% decanediamine, 7.5 mol-% hexamethylenediamine and 50 mol-% terephthalic acid, whereas the amounts of the three monomers add up to 100 mol-% and the amounts of the diamines add up to 50 mol-%. The melting point of this partially crystalline polyamide is 295° C.

The partially crystalline polyamide 10T/6T/10I/6I, is made from decanediamine, hexamethylenediamine, terephthalic acid and isophthalic acid with an amount of decanediamine of 7.5 to 20 mol-%, an amount of hexamethylenediamine of 30 to 42.5 mol-%, an amount of terephthalic acid of 36 to 49.15 mol-% and an amount of isophthalic acid of 0.85 to 14 mol-%, whereas the amounts of the four monomers add up to 100 mol-% and the amounts of the diamines add up to 50 mol-% and the amounts of the dicarboxylic acids add up to 50 mol-%.

Preferably the partially crystalline polyamide 10T/6T/10I/6I, is made from decanediamine, hexamethylenediamine, terephthalic acid and isophthalic acid with an amount of decanediamine of 12.5 to 20 mol-%, an amount of hexamethylenediamine of 30 to 37.5 mol-%, an amount of terephthalic acid of 37.5 to 47.5 mol-% and an amount of isophthalic acid of 2.5 to 12.5 mol-%, whereas the amounts of the four monomers add up to 100 mol-% and the amounts of the diamines add up to 50 mol-% and the amounts of the dicarboxylic acids add up to 50 mol-%.

More preferably the partially crystalline polyamide 10T/6T/10I/6I, is made from decanediamine, hexamethylenediamine, terephthalic acid and isophthalic acid with an amount of decanediamine of 14 to 19 mol-%, an amount of hexamethylenediamine of 31 to 36 mol-%, an amount of terephthalic acid of 40 to 45 mol-% and an amount of isophthalic acid of 5.0 to 10 mol-%, whereas the amounts of the four monomers add up to 100 mol-% and the amounts of the diamines add up to 50 mol-% and the amounts of the dicarboxylic acids add up to 50 mol-%.

Most preferably the partially crystalline polyamide 10T/6T/10I/6I, is made from 16.65 mol-% decanediamine, 33.35 mol-% hexamethylenediamine, 43.2 mol-% terephthalic acid and 6.8 mol-% isophthalic acid, whereas the amounts of the four monomers add up to 100 mol-% and the amounts of the diamines add up to 50 mol-% and the amounts of the dicarboxylic acids add up to 50 mol-%. The melting point of this partially crystalline polyamide is 318° C.

It is to be noted that the term "polyamide" is a generic term, which comprises both homopolyamides and copolyamides. The abbreviated polyamide nomenclature conforms to the norm ISO 1874-1:2010. The diamine 2-methyl-1,5-pentanediamine is abbreviated as MPMD. The diamine 2-methyl-1,8-octanediamine is abbreviated as MOD.

It is further preferred that the at least one fibrous reinforcing agent are selected from glass fibres, preferably chopped glass fibres. The fibres reinforcing agent is preferably comprised in an amount of 5 to 15% by weight, more preferably in an amount of 7 to 12% by weight.

The chopped glass fibres have a fibre length of 1 to 25 mm, preferably 1.5 to 20 mm, more preferably 2 to 12 mm, most preferably 2.5 to 8 mm. The chopped glass fibres have a diameter of 4 to 20 µm, preferably 5 to 15 µm, more preferably 6 to 12 µm.

Chopped glass fibres with a round, oval, elliptical, angular or rectangular cross-section are used. Preferably the chopped glass fibres have a round cross-section.

The chopped glass fibres are equipped with a suitable sizing system, e.g. on a silane basis. Glass fibres made of all types of glass, such are as e.g. A-, C-, D-, E-, M-, S-, R-glass or any mixtures thereof, can be used. Glass fibres made of E-glass or glass fibres made of mixtures with E-glass or mixtures with E-glass fibres are preferred.

The at least one non-sized filler has preferably a needle like or flaky shape. The longest dimension of the non-sized filler particle is at most 2500 µm, preferably at most 700 µm, more preferably 0.1 to 300 µm. A longest dimension of the non-sized filler particle of at most 2500 μm is particularly common with filler particles having a flaky shape.

The non-sized fillers are selected from the group consisting of milled glass fibres, milled carbon fibres, glass flakes, whiskers, wollastonite, mica, phyllosilicates and mixtures thereof. These non-sized fillers are in any case different from the fibres reinforcing agents according to b). The at least one non-sized filler is preferably comprised in an amount of 15 to 35% by weight, more preferably 20 to 33% by weight.

Preferably the non-sized fillers are selected from the group consisting of milled glass fibres, milled carbon fibres, glass flakes, wollastonite, mica and mixtures thereof. More preferably the non-sized fillers are selected from the group consisting of milled glass fibres, wollastonite, mica and mixtures thereof.

Mica can be natural mica or synthetic mica, whereas synthetic mica is preferred.

Whiskers are needle-like mono-crystals from metals, oxides, borides, carbides, nitrides, polytitanates, carbon etc. with mostly polygonal cross section, e.g. potassium titanate-, aluminium oxide-, silicium carbide-whisker. Whiskers can be produced by vapour deposition (VS-mechanism) or deposition from a three-phase-system (VLS-mechanism).

As phyllosilicates, also named layered silicates, e.g. serpentine, talcum, mica, vermiculite, illite, smectites, montmorillonites, kaolin (also named china clay), bentonites can be used. Preferred as phyllosilicates are mica, montmorillonites and kaolin. More preferred as phyllosilicates are mica and montmorillonites.

According to a preferred embodiment of the invention the moulding composition comprises 32 to 44% by weight, more preferably 35 to 42% by weight of the components b) and c) in sum.

It is further preferred that the moulding composition comprises at least one additive which is selected from the group consisting of inorganic stabilisers, organic stabilisers, lubricants, colouring- and marking materials, inorganic pigments, organic pigments, IR absorbers, antistatic agents, antiblocking agents, crystal-growth inhibitors, nucleating agents, condensation catalysts, chain extenders, defoamers, chain-lengthening additives, conductivity additives, carbon black, graphite, carbon nanotubes, mould-release agents, separating agents, flame retardants, non-halogen-containing flame retardants, anti-dripping-agents, impact modifiers, optical brighteners, photochromic additives, metallic pigments, metal-coated particles, or mixtures thereof, preferably inorganic stabilizers as copper and potassium iodide.

The at least one additive is preferably comprised in an amount of 0.05 to 6% by weight, more preferably 0.1 to 5% by weight.

Moreover, a moulded article is provided which is producible from the above-described moulding composition. Such moulded article is preferably a lamp housing, lamp extension, lamp reflector, lamp socket, more preferably a lamp plug socket.

Production of Polyamide Moulding Compositions

To produce the polyamide moulding composition the components a) to d) were compounded on typical compounding machines, e.g. single- or twin-screw extruders or screw kneaders. The dried component a) will be metered via a gravimetric metering scale into the intake. Component b) can be metered via a gravimetric metering scale into the intake or via a side feeder into the molten component a). Components c) and if necessary d) can be metered separately into the intake or via a side feeder into the molten component a). Components a), c) and d) can also be metered into the intake in form of dry blends.

For production dry blends the desired components are mixed and this mixture is homogenized for 10 to 40 min. by means of a tumble mixer, drum hoop mixer, or tumble dryer. To avoid moisture absorption, this can be performed under dry protective gas.

The compounding is performed at set cylinder temperatures of 70 to 100° C. for the first cylinder and depending on the nature of component a) 310 to 390° C. (respectively 260 to 280° C. for comparison examples 5 and 6) for the remaining cylinders. Vacuum can be applied or degassing can be performed to the atmosphere before the nozzle. The melt is extruded in strand form, cooled down in a water bath at 10 to 90° C. and subsequently pelletized. The pellets are dried for 12 to 24 hours at 80 to 120° C. under nitrogen or in vacuum to a water content of less than 0.1 wt-%.

The present invention is described in more detail by the following examples.

The following measuring specifications were used to analyse the polyamides and test the polyamide moulding compounds.

Relative Viscosity (RV):
ISO 307
Pellets
0.5 g in 100 ml m-cresol for PA 6T/6I, PA 6T/66
1.0 g in 100 ml sulfuric acid (96%) for PA 6, PA 66
Temperature 20° C.
Calculation of the relative viscosity according to $RV=t/t_0$ Melting Point:
ISO 11357
Pellets
Differential scanning calometry (DSC) was performed at a heating rate of 20 K/min. For the melting point, the temperature was specified at the peak maximum.

HDT (Heat Deflection Temperature):
ISO 75
ISO test bar, standard: ISO/CD 3167, type B1, 80×10×4 mm
HDT A load 1.80 MPa Flexural Modulus:
ISO 178
ISO test bar, standard: ISO/CD 3167, type B1, 80×10×4 mm
Testing speed 2 mm/min
Temperature 23° C.

Particle Size Distribution:
ISO 13320
Filler particles
Temperature 23° C.
The laser measurements are implemented according to the principle of laser diffraction with a Granulometer Cilas 1064 of Quantachrome GmbH (Germany).

Fogging:
50 g of pellets are placed into a beaker (height 90 mm, inner diameter 86 mm) and a round glass plate (98×4.75 mm) is set on the beaker opening. The beaker is immersed 35 mm into an oil-bath for 8 hours at 200° C. After that the glass plate is removed and cooled for 12 hours at 23° C., 50% relative humidity.
Fogging is indicated as haze in % calculated by subtraction of haze value of initial glass plate from haze value of glass plate after fogging test.
Haze measurement is performed according ASTM D 1003 at 23° C. Measuring device: Haze Gard Plus from Byk Gardener with CIE light type C. The haze value is stated in percent of irradiated light quantity.

Production of Test Pieces

The test pieces for the flexural modulus and HDT test were produced on an injection moulding machine by the Arburg Company, Modell Allrounder 420 C 1000-250. For polyamide 6T/6I compounds or polyamide 6T/66 compounds increasing cylinder temperatures from 310° C. to 340° C. were thereby used. The moulding temperature was 130 to 150° C. For polyamide 66 compounds or polyamide 6 compounds increasing cylinder temperatures from 260° C. to 290° C. were thereby used. The moulding temperature was 70 to 90° C.

The test bodies were used in a dry state, they were stored for this purpose after the injection moulding for at least 48 h at room temperature in a dry environment, i.e. over silica gel.

The following materials were used in the examples and comparative examples which are shown in table 1.

EXAMPLES

For the preparation of the polyamide moulding compositions the following materials were used (s. Table 1):

TABLE 1

| Component | Description | Trade Name | Producer |
|---|---|---|---|
| PA 6I/6T | polyamide 6T/6I (70/30 mol-%) made of hexamethylendiamine, terephthalic acid and isophthalic acid RV* 1.56, melting point 325° C. | — | EMS-CHEMIE AG, Switzerland |
| PA 6T/66 | polyamide 6T/66 (52/48 mol-%) made of hexamethylendiamine, terephthalic acid and isophthalic acid RV* 1.72, melting point 310° C. | — | EMS-CHEMIE AG, Switzerland |
| PA 6 | polyamide 6 made of ε-caproclactam RV** 2.5, melting point 222° C. | 1013B | Ube Industries, Japan |
| PA 66 | polyamide 66 made of hexamethylendiamine and adipic acid RV** 2.6, melting point 260° C. | Leona 1200 | Asahi Chemical Industry, Japan |
| CuI | copper (I) iodide, purity at least 98%, CAS-No. 7681-65-4 | — | Junsei Chemical Co., Ltd, Japan |
| KI | potassium iodide, purity at least 98%, CAS-No. 7681-11-0 | — | Junsei Chemical Co., Ltd, Japan |
| chopped glass fiber | length 3 mm, diameter 11 µm | CS3J-260 | Nitto Boseki Co., Ltd., Japan |
| milled glass fiber | length 70 µm, diameter 10.5 µm, no sizing | PF70E-001 | Nitto Boseki Co., Ltd., Japan |
| wollastonite | needle shape, aspect ratio 15:1, average ($D_{50}$) particle size 11 µm, CAS-No. 013983-17-0 | SH-600 | Kinsei Matec Co., Ltd, Japan |

RV* relative viscosity, measured on a solution made of 0.5 g polyamide in 100 ml m-cresol at 20° C.
RV** relative viscosity, measured on a solution made of 1.0 g polyamide in 100 ml sulfuric acid (96%) at 20° C.

Production of polyamide moulding composition of example 1:

The dried pellets of the partially crystalline polyamide 6T/6I (component a)) and a dry blend of components c) and d) were metered separately via gravimetric metering scales into the intake. Component b) was metered via a side feeder 4 cylinders bevor the die into the melt.

The compounding is performed on a twin-screw extruder from Toshiba Machine Co., Ltd. Modell TEM-37BS at a set cylinder temperature of 80° C. for the first cylinder and 325 to 340° C. for the remaining cylinders. Degassing was performed to the atmosphere before the nozzle. The revolution speed was 120 rpm and the throughput 10 kg/h. The strands were cooled down in a water bath at 85° C. and subsequently pelletized. The pellets were dried for 24 hours at 110° C. in vacuum (30 mbar) to a water content of less than 0.1 wt-%.

Table 2 shows the results for the mechanical and the fogging properties of the inventive examples together with comparative examples.

TABLE 2

| Component | Unit | Examples | | Comparative Examples | | | |
|---|---|---|---|---|---|---|---|
| | | 1 | 2 | 3 | 4 | 5 | 6 |
| polyamide 6T/6I | wt.-% | 59.87 | 59.87 | 69.87 | — | — | — |
| polyamide 6T/66 | wt.-% | — | — | — | 59.87 | — | — |
| polyamide 66 | wt.-% | — | — | — | — | 59.87 | — |
| polyamide 6 | wt.-% | — | — | — | — | — | 59.87 |
| chopped glass fibers | wt.-% | 10 | 10 | 30 | 10 | 10 | 10 |
| milled glass fibers | wt.-% | 30 | — | — | 30 | 30 | 30 |
| wollastonite | wt.-% | — | 30 | — | — | — | — |
| CuI | wt.-% | 0.03 | 0.03 | 0.03 | 0.03 | 0.03 | 0.03 |
| KI | wt.-% | 0.1 | 0.1 | 0.1 | 0.1 | 0.1 | 0.1 |
| | | | | Tests | | | |
| flexural modulus | MPa | 9380 | 9300 | 10590 | 8340 | 7700 | 8010 |
| HDT A (1.80 MPa) | ° C. | 232 | 217 | 284 | 263 | 241 | 196 |
| Fogging | haze % | 2.1 | 4.1 | 13.8 | 39.7 | 35.3 | 34.2 |

It is obvious from Table 2 that the inventive examples 1 and 2 have the lowest haze which means the best fogging properties. Example 1 differs from example 2 that milled glass fibers instead of wollastonite are used as fillers. The best fogging properties were determined for example 1 with milled glass fibers as filler. Also obvious from the comparative examples 4 to 6 is the importance of the selection of the right partially crystalline polyamide. Despite of the same combination of components b) and c) in same amounts only with a partially crystalline polyamide a) containing exclusively aromatic dicarboxylic acids as dicarboxylic acids the fogging requirements can be fulfilled.

The invention claimed is:

1. A polyamide moulding composition consisting of the following components:
   a) 50 to 75% by weight of at least one partially crystalline polyamide consisting of at least one diamine and at least one aromatic dicarboxylic acid, wherein the at least one diamine has 4 to 18 carbon atoms and is selected from the group consisting of linear aliphatic diamines, branched aliphatic diamines, and cycloaliphatic diamines,
   b) 5 to 20% by weight of at least one fibrous reinforcing agent,
   c) 10 to 40% by weight of at least one non-sized filler which is different from the fibrous reinforcing agent in b), and wherein the at least one non-sized filler is
      selected from the group consisting of milled glass fibres, milled carbon fibres, glass flakes, wollastonite, mica, phyllosilicates, and mixtures thereof, or whiskers, or
      is a mixture of at least one non-sized filler selected from the group consisting of milled glass fibres, milted carbon fibres, glass flakes, wollastonite, mica, phyllosilicates, and mixtures thereof; and whiskers, and
   d) 0 to 6% by weight of at least one additive,
   with the proviso that components b) and c) add up to 25 to 45% by weight and the entirety of components (a) to (d) adds up to 100% by weight,
   wherein the moulding compositions a condensable outgassing resulting in a haze of a maximum of 10%, measured by determining the haze on a glass plate after a thermal treatment of pellets of the rob/amide moulding composition at 200° C. for a period of 8 hours.

2. The moulding composition of claim 1, wherein the moulding composition has a deflection temperature under load (HDT (A)) according to ISO 75 of at least 190° C.

3. The moulding composition of claim 1, wherein the moulding composition has a condensable outgassing resulting in a haze of maximum of 7%.

4. The moulding composition of claim 1, wherein the moulding composition has a deflection temperature under load (HDT (A)) according to ISO 75 of at least 190° C. and a condensable outgassing of a maximum of 10%.

5. The moulding composition of claim 1, wherein the at least one dicarboxylic acid of the partially crystalline polyamide selected from the group consisting of terephthalic acid, isophthalic acid, 2,6-naphthalenedicarboxylic acid, and mixtures thereof.

6. The moulding composition of claim 1, wherein the at least one partially crystalline polyamide is selected from the group consisting of PA 6T/6I, PA 10T/6T, PA 10T/6T/10I/6I, and mixtures or blends thereof, in an amount of 50 to 69.95% by weight.

7. The moulding composition of claim 1, wherein the at least one fibrous reinforcing agent are glass fibres in, an amount of 5 to 15% by weight.

8. The moulding composition of claim 1, wherein the at least one non-sized filler is comprised in an amount of 15 to 35% by weight.

9. The moulding composition of claim 1, wherein components b) and c) add up to 30 to 44% by weight.

10. The moulding composition of claim 1, wherein the at least one additive is selected from the group consisting of inorganic stabilisers, organic stabilisers, lubricants, colouring- and marking materials, inorganic pigments, organic pigments, IR absorbers, antistatic agents, antiblocking agents, crystal-growth inhibitors, nucleating agents, condensation catalysts, chain extenders, defoamers, chain-lengthening additives, conductivity additives, carbon black, graphite, carbon nanotubes, mould-release agents, separating agents, flame retardants, non-halogen-containing flame retardants, anti-dripping-agents, impact modifiers, optical brighteners, photochromic additives, metallic pigments, metal coated particles, and mixtures thereof; and wherein the composition comprises the at least one additive in an amount of 0.05 to 6% by weight.

11. A moulded article produced from the moulding composition of claim 1.

12. The moulded article of claim 11, wherein the article is a lamp housing, lamp extension, lamp reflector, lamp socket, or a lamp plug socket.

* * * * *